April 21, 1925.

W. C. BRINTON, JR 1,534,025

TIMER GOVERNOR

Filed June 17, 1921

WITNESS:
Rob't R Kitchel

INVENTOR
William C. Brinton, Jr.
BY
Frank S. Busser
ATTORNEY.

Patented Apr. 21, 1925.

1,534,025

UNITED STATES PATENT OFFICE.

WILLIAM C. BRINTON, JR., OF KENNETT SQUARE, PENNSYLVANIA, ASSIGNOR TO PHILBRIN CORPORATION, OF KENNETT SQUARE, PENNSYLVANIA, A CORPORATION OF DELAWARE.

TIMER GOVERNOR.

Application filed June 17, 1921. Serial No. 478,456.

*To all whom it may concern:*

Be it known that I, WILLIAM C. BRINTON, Jr., a citizen of the United States, residing at Kennett Square, county of Chester, and State of Pennsylvania, have invented a new and useful Improvement in Timer Governors, of which the following is a full, clear, and exact description, reference being had to the accompanying drawings, which form a part of this specification.

My invention relates to means for controlling or governing the ignition of an electrically ignited internal combustion engine.

As is well known, in connection with internal combustion engines in which the charge in the cylinders is ignited or fired through the medium of an electric spark, an ignition apparatus, driven by the engine, is provided wherein the spark is delivered in the cylinder in timed relationship to a certain position of the piston.

The ignition apparatus is normally so arranged as to be manually governed during operation to deliver the spark to the cylinder at a variety of piston positions throughout a range, so that at varying speeds of the engine the apparatus may be adjusted to deliver the spark when the piston is in the proper position to have the charge fired at any given speed.

The range of piston position is normally from slightly past dead centre to a number of degrees before dead centre so that by advancing and retarding the spark, as the engine speed increases or decreases, the charge will be ignited in time to permit combustion to take place and cause the maximum pressure to be exerted on the piston, when it reaches a predetermined position, usually just past dead centre.

Manually adjustable ignition apparatus is open to a number of objections, chief among which is that the efficient adjustment of the spark, and as a direct result the efficiency of the engine, is dependent on the skill and attention of the operator of the engine. Lack of skill or inattention to the proper adjustment of the spark results in inefficiency in the performance of and damage to the engine.

The object of my invention is to provide means whereby exact adjustment of the spark will be automatically effected for all engine speeds, which will be capable of adjusting the spark through any desired range and which will be sensitive to slight changes in speed and at the same time simple in construction and operation.

Having now indicated the nature of my invention, I will proceed to describe a preferred embodiment thereof with reference to the accompanying drawings in which—

Figure 1:
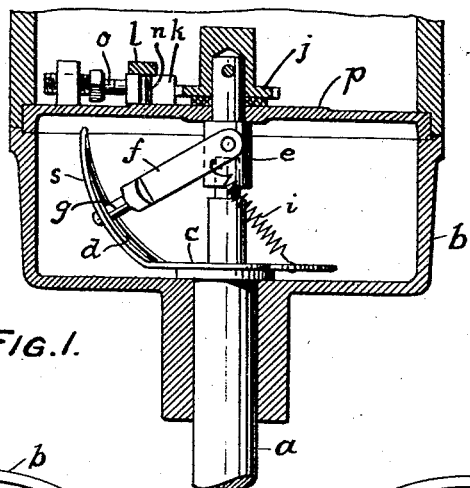
Figure 1 is a vertical sectional view of a portion of an ignition device embodying my invention.
Figure 2:
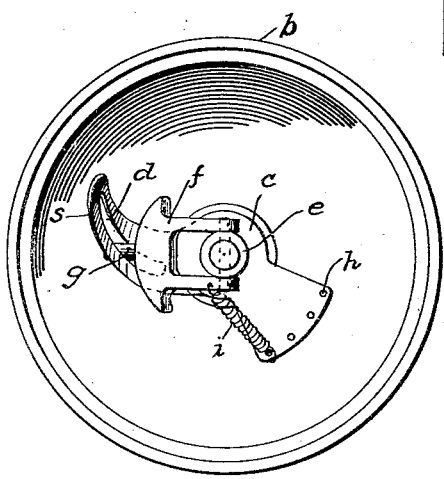
Figure 2 is a view from above of a detail of the apparatus in the lower portion of the apparatus, Figure 1.
Figure 3:
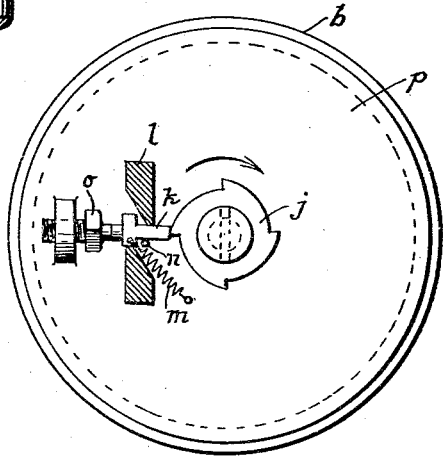
Figure 3 is a plan view partly broken away of the apparatus in the upper portion of the apparatus, Figure 1.
Figure 4:
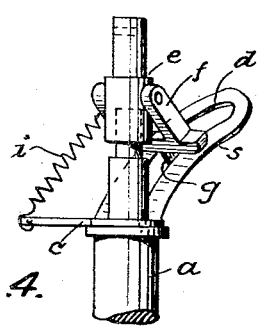
Figure 4 is a perspective view of a detail of the device embodying my invention.

The shaft $a$, suitably driven from an engine shaft, extends up through a bearing in a base $b$ and has fixedly secured to it, within the base, a plate $c$ having a curved arm $s$ at one end, which extends upwardly and at an angle, and is provided with a cam slot $d$. Opposite the arm $s$, plate $c$ is extended and provided with a series of holes $h$ arranged on the arc of a circle. The shaft $a$ is reduced in diameter at its upper end and is adapted to freely extend into a socket formed in the lower end of a short shaft $e$. To the short shaft $e$ is trunnioned a lever or arm $f$ weighted at its outer end and provided with a pin $g$ adapted to extend into slot $d$ in arm $s$. The spring $i$ is secured to one end of the arm $f$ and at the other to plate $c$ by engagement in one of the holes $h$. The shaft $e$ extends through a plate $p$, supported by base $b$, and has fixedly secured to its upper end a breaker cam $j$ adapted to act on and advance a movable contact $k$ supported in a guide $l$, mounted on plate $p$, and tensioned by means of a spring $m$, a pin $n$ is provided to guide the contact $k$ and limit its movement. An adjustable fixed contact $o$ is mounted on plate $p$ adjacent contact $k$ and is so adjusted that when contact $k$ is advanced by the cam it will contact with contact $c$, as shown in Figure 3, and when contact $k$ is released by the cam, contact with contact $k$ will be broken. On the hub of the breaker cam $j$ is suitably mounted a rotor, not shown, for distributing current to various cylinders of the engine, as is customary.

The operation of the above device will be understood from the following:

When the engine is at rest, the arm $f$ will, under the influence of the spring $i$, rest in its lowermost position with the pin $g$ at the bottom of cam slot $d$ in plate $c$. The engine is then timed by setting the breaker cam as usual. When the engine is turned over the shaft $a$ will be rotated and shaft $e$ carrying the breaker cam will be driven through plate $e$, arm $s$, and arm $f$. After the engine has started, centrifugal force will act on arm $f$ and cause it to tend to fly out against the action of its spring $i$, and as the speed increases, centrifugal force will overcome the tension of spring $i$, the arm $f$ will rise and guided by the engagement of the pin $g$ in the cam slot $d$, rotate the shaft $e$ relative to shaft $a$, thus changing the set or position of the breaker cam and cause the breaker to act earlier which results in advancing the spark. As the speed decreases, the arm $f$ will tend to settle, shaft $e$ will be rotated back toward its original position and the spark will be retarded.

Figure 5:
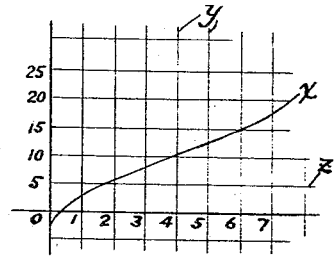
Figure 5 is a diagram illustrative of the method of obtaining graphically any desired range of spark control.

The range and variation of the spark will be determined by the length and curve of slot $d$ which may be accurately determined for any desired condition by a graph as shown in Figure 5, wherein the curve $x$ is drawn through a succession of points of intersection of given engine speed lines $y$ and lines of degrees of spark advance desired $z$ at the given speeds.

Having now fully described my invention, what I claim and desire to protect by Letters Patent is—

1. In an ignition device for internal combustion engines, in combination, a pair of relatively revoluble shafts, an arm provided with a cam slot fixedly secured to one of said shafts, an arm pivotally secured to the other shaft about an axis at an angle to the axes of the shafts and having a free end extending into said cam slot, whereby a driving connection is formed between said shafts, and a breaker cam mounted on said last mentioned shaft, said pivoted arm being adapted to fly out under the influence of centrifugal force and guided by said cam slot to effect a rotation of said breaker cam relative to said first mentioned shaft.

2. An ignition device for internal combustion engines, comprising a driving shaft, a breaker cam shaft, loosely connected therewith, an arm provided with a cam slot fixedly secured to said first mentioned shaft, and an arm pivotally secured to said last mentioned shaft about an axis at right angles to the shaft, a free end of the arm extending into said slot whereby a driving connection is formed between said shafts, said pivoted arm being adapted to fly out under the influence of centrifugal force and rotate said breaker cam shaft relatively to said driving shaft.

3. An ignition device for internal combustion engines, comprising a circuit breaker, a breaker cam shaft, a driving shaft, a cam attached to one of said shafts, and a centrifugal arm pivotally attached to the other of said shafts and in engagement with said cam, the axis about which the arm swings being at right angles to the axes of said shafts, whereby a driving engagement will be maintained between said shafts and at the same time rotation of said breaker cam shaft relative to said driving shaft will be effected through the action of centrifugal force on said centrifugal arm under the guidance of said cam.

4. An ignition device for internal combustion engines, comprising a circuit breaker, a driving shaft, a breaker cam shaft mounted on said driving shaft, a fixed arm, provided with a cam slot, secured to one of said shafts, an arm pivotally secured on radial trunnions extending from the other shaft, a free end of the last mentioned arm extending into the cam slot of the other arm, and a spring connected to said pivoted arm, said arms forming a driving connection between said shafts, said pivoted arm being adapted to fly out against the tension of said spring under the influence of centrifugal force and guided by said cam slot effect a rotation of said breaker cam shaft relative to said driving shaft and thus effect a change in the timing of said circuit breaker.

In testimony of which invention, I have hereunto set my hand, at Philadelphia, on this 15th day of June, 1921.

WILLIAM C. BRINTON, JR.